United States Patent [19]
Dunmire

[11] 3,944,190
[45] Mar. 16, 1976

[54] TRANSIT MIX SYSTEM AND METHOD, AND SUPPORT FOR TRANSIT MIX UNIT

[76] Inventor: Paul E. Dunmire, 12 Lawridge Road, Santa Cruz, Calif. 95060

[22] Filed: Feb. 21, 1974

[21] Appl. No.: 444,390

[52] U.S. Cl. ............ 259/177 R; 214/515; 214/38 D
[51] Int. Cl.² .......................................... B28C 5/18
[58] Field of Search.... 259/175, 176, 177 R, 177 A, 259/3, 14, 30, 81 R, 171; 214/515, 38 D, 514, 517

[56] References Cited
UNITED STATES PATENTS

| | | | |
|---|---|---|---|
| 1,919,073 | 7/1933 | Paris | 259/175 |
| 2,793,013 | 5/1957 | Mittelstadt | 250/177 R |
| 3,215,411 | 11/1965 | Pitts | 259/177 R |
| 3,380,600 | 4/1968 | Klanner | 214/38 D |

*Primary Examiner*—Robert W. Jenkins
*Attorney, Agent, or Firm*—Stanley Bialos

[57] ABSTRACT

A portable transit mix unit comprising a support base and concrete mixer drum thereon, is provided with rollers movably connected to the base whereby the base can be elevated out of engagement with the bed of a truck or lowered to support the unit directly on the bed. In the elevated position of the base, the unit can be rolled off of the truck bed onto a support stand. This enables the truck to be used for other purposes while the unit is supported on the stand. The stand includes a tiltable platform which when inclined forwardly, facilitates transfer of the unit from the platform onto the truck bed.

10 Claims, 8 Drawing Figures

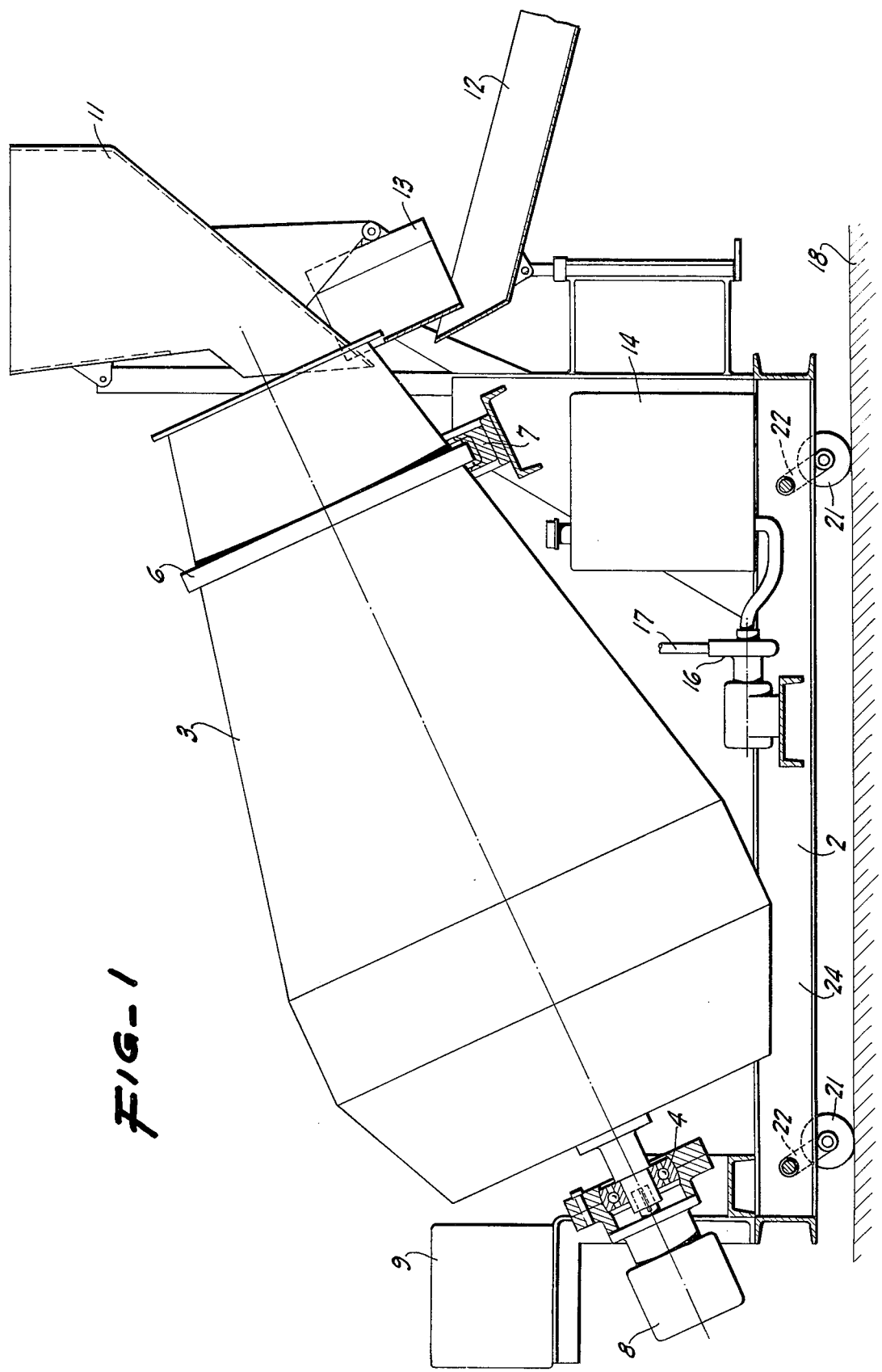

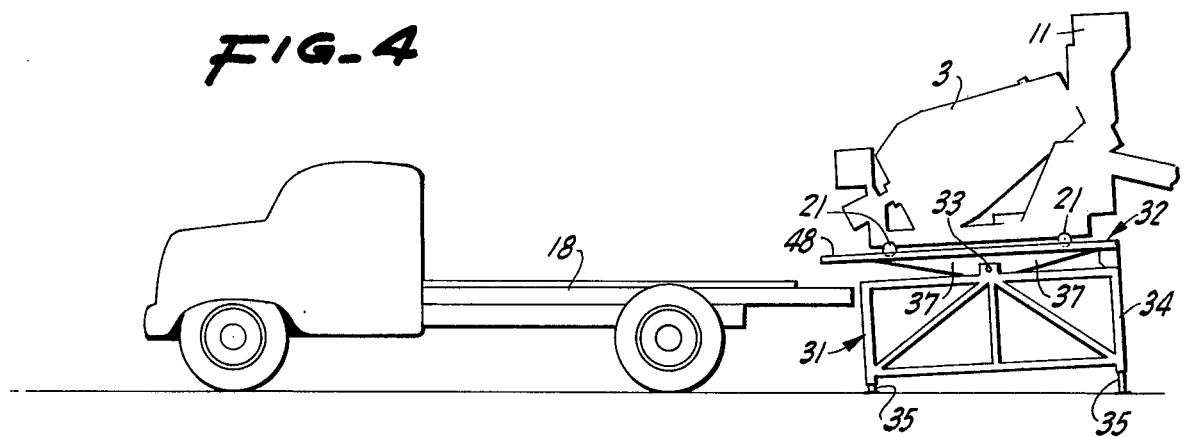
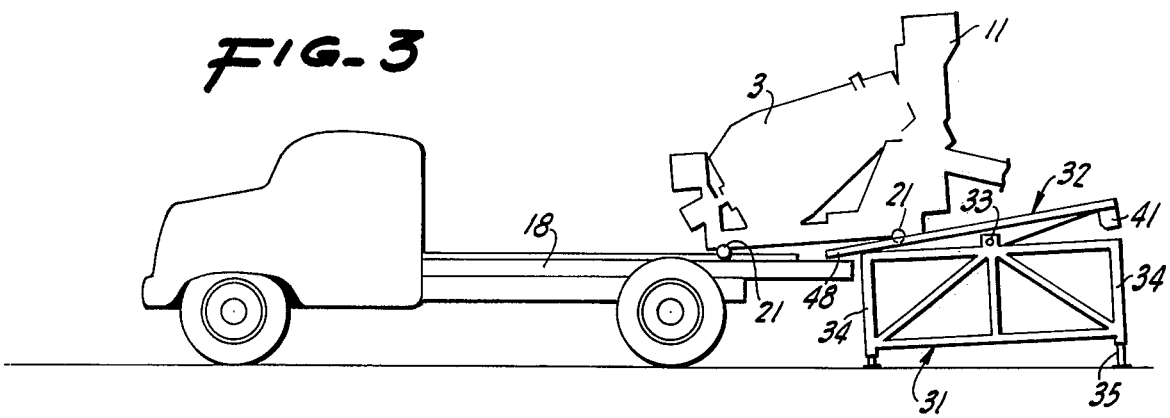
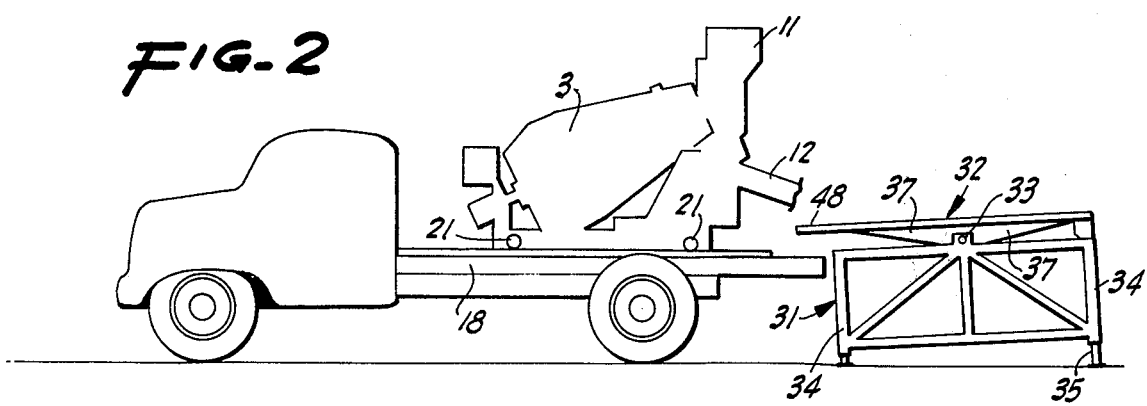

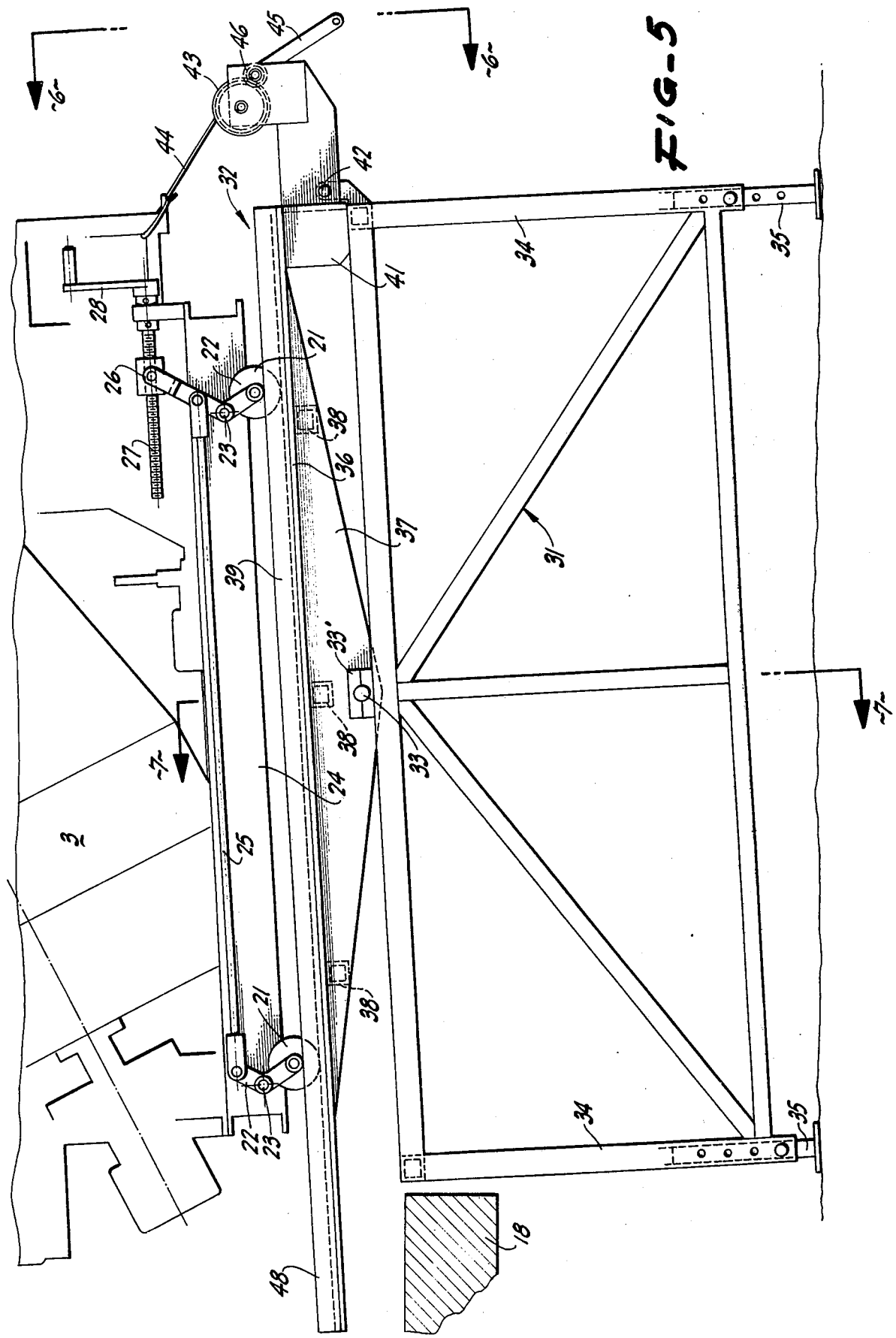

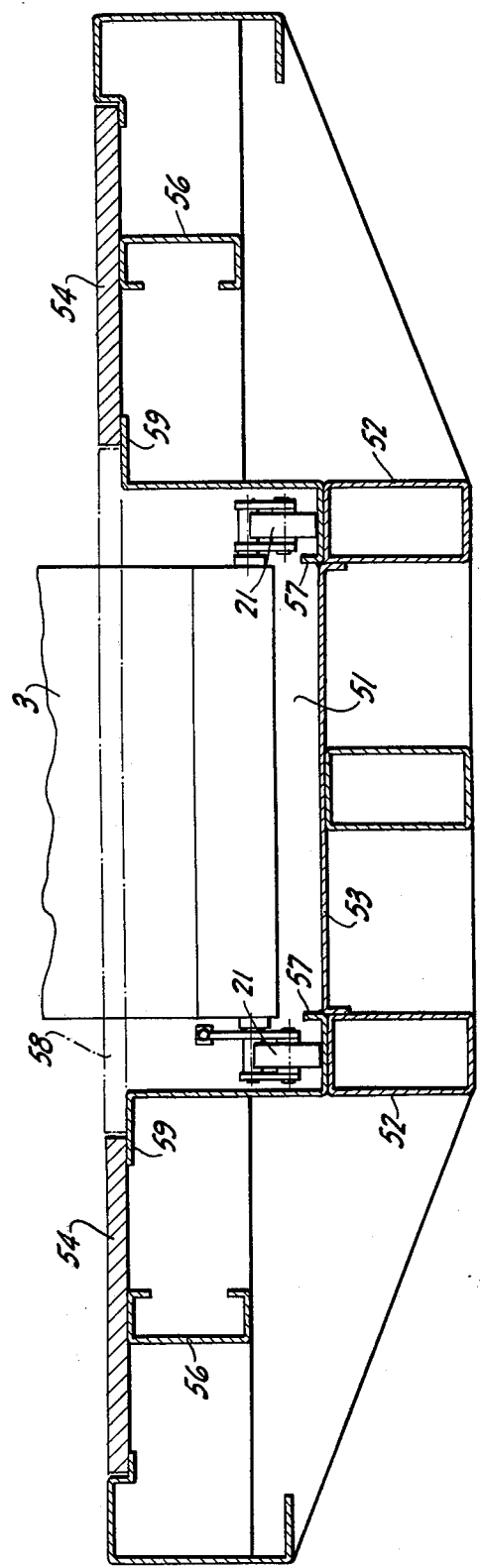

TRANSIT MIX SYSTEM AND METHOD, AND SUPPORT FOR TRANSIT MIX UNIT

BACKGROUND OF THE INVENTION

Applicant's U.S. Pat. No. 3,767,171, dated Oct. 23, 1973, discloses a small volume transit mix system wherein a transit mix unit is removably mounted on the bed of a pick up truck. If the truck is to be used for other purposes, the transit mix unit thereon must be removed by a derrick or hoist. Frequently, the party renting the truck with the concrete mixer unit thereon does not have a derrick available. Also, there are seasons of the year, particularly in the wintertime, when concrete pouring is not practical; and if the concrete mixer unit remains on the truck this ties up the truck rendering it non-useful for hauling purposes.

SUMMARY AND OBJECTS OF THE INVENTION

Summarizing the invention hereof, it comprises a system and method whereby the concrete mixer unit can be readily removed from the bed of a truck, such as a conventional pick up truck, onto an auxiliary support when it is desired to use the truck for other purposes. For such purpose, the concrete mixer unit comprises a support base on which a concrete mixer drum and appurtenances therefor is mounted. The base is supported on rollers which enable the unit to be rolled on the bed of a truck or any other support surface.

These rollers are movably connected to the base for selectively lowering the unit of engagement with the bed of the truck so that the unit can be rolled, or into engagement with the bed for fixed support thereon. Thus, when the transit mix unit is to be removed from the truck bed, the unit is elevated with reference to the rollers. Initially, the unit is mounted on the truck bed by a hoist.

Means is provided comprising an auxiliary support stand for the unit, including a support platform. When the truck is backed up adjacent the front of the platform, the unit can be transferred from the truck bed onto the platform by rolling the same from the bed; and the unit can remain on the platform as long as desired thus rendering the truck useful for other loads. When the unit is to be returned to the truck bed, the truck is backed up adjacent the front of the platform, and the unit is rolled from the platform onto the truck bed.

As the concrete mixer unit is quite heavy, means is provided on the auxiliary support for the unit for effecting the transfer. Such means comprises a winch on the support, desirably connected to the support platform, and a cable connectable to the unit, and which is operable by the winch to roll the unit from the truck bed onto the platform. When on the platform, the winch and cable hold the unit securely thereon.

The platform is pivotally mounted on a main frame of the support therefor, for fore and aft tilting movement about a horizontal axis so that the platform can tilt from a substantially horizontal position to a forwardly inclined position, and vice versa. In either the forwardly inclined position or horizontal position of the platform, the truck is backed up with the unit mounted thereon and with its bed adjacent the front of the platform, and the unit is transferred to the platform by the winch and cable.

The pivotal connection of the platform is such that when it is inclined during the transfer of the unit from the truck to the platform, the weight of the truck thereon positions it to a horizontal position for holding the unit. In retransferring the unit from the platform to the truck, the cable is released and slight shoving of the unit causes the platform to tilt forwardly so that the unit can roll onto the truck, primarily by gravity with perhaps manual pushing of the platform onto the truck bed. The platform is provided with forward extension means to bridge space between the rear of the truck bed and the front of the platform when transfer is effected from one to the other.

From the preceding it is seen that the invention has as its objects, among others, the provision of simple and economical means enabling a portable transit mix unit to be transferred from the bed of a truck onto a support therefor, thus obviating the necessity of removing the transit mix unit by a derrick or hoist when it is desired to use the truck for other purposes, and to a simple method for accomplishing this result. Other objects will become apparent from the following more detailed description thereof and accompanying drawings, in which:

DESCRIPTION OF THE DRAWINGS

FIG. 1 is a schematic side elevational view of a typical portable transit mix unit with supporting rollers of this invention movably connected thereto;

FIG. 2 is a schematic side elevational view illustrating a pick up truck with the transit mix unit hereof backed up adjacent the front end of a support platform for transfer of the unit to the platform;

FIG. 3 is a similar view illustrating the transit mix unit partially rolled onto the platform support therefor;

FIG. 4 is likewise a similar view illustrating a transit mix unit on the platform;

FIG. 5 is a side elevational view, partly in section, of the auxiliary support therefor;

FIG. 8 is a transverse sectional elevation of a special form of truck bed for supporting the transit mix unit at a low center of gravity.

DETAILED DESCRIPTION

Figure 7:
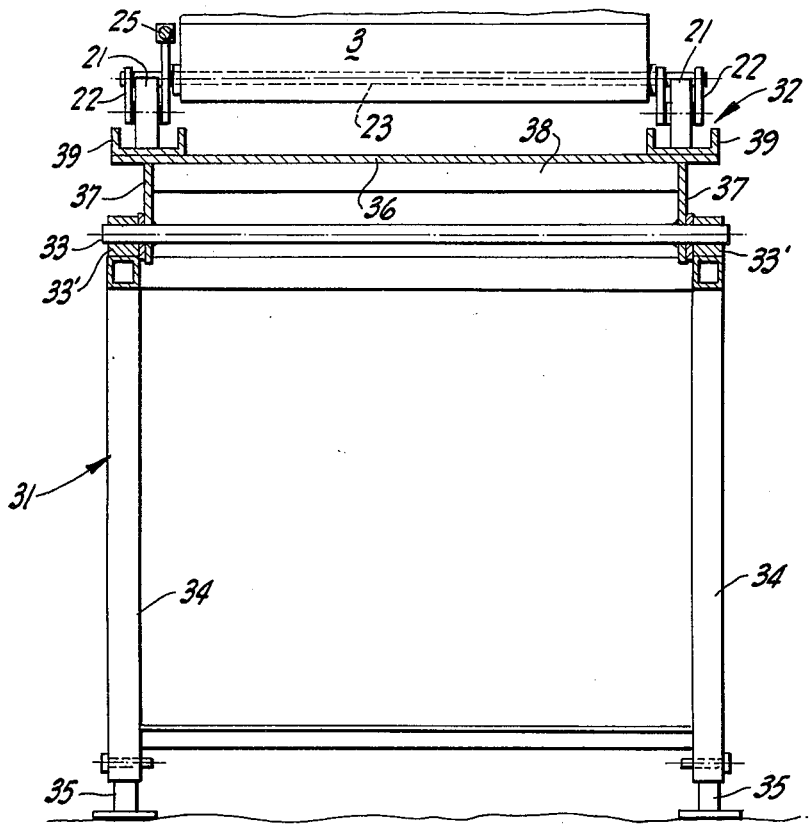
FIG. 7 is a transverse section taken in a plane indicated by line 7 —7 in FIG. 5.

Referring to FIG. 1 illustrating a typical small volume transit mix unit for concrete, as is disclosed in applicant's aforementioned patent, the unit comprises a base 2 on which is supported a mixer drum 3 journaled in bearings 4 at its forward end, and at its rear end by bearing ring 6 engaging bearings 7. A hydraulic motor 8 operable by gas engine driven, hydraulic supply unit 9 rotates mixer drum 3 as in the aforementioned patent. A loading hopper 11 is provided to load the drum; and a pivoted discharge chute 12 from which concrete may be transferred through transfer chute 13, are also provided. After the drum is discharged, it may be washed out by water in water tank 14 fed by pump 16 through feed pipe 17. The above elements are substantially the same as those disclosed in the aforementioned patent but any other suitable arrangement of drum on a support base, with appurtenances may be employed.

Means is provided for raising or lowering the aforedescribed unit with reference to a support surface, such as the support bed of a conventional flat bed pick up truck, indicated by reference numeral 18. Such means comprises front and rear sets of rollers 21 journaled on roller bearings and which are carried by bell crank arms 22 fixed to fore and aft pivot shafts 23 journaled in side beams 24 forming part of the base 2 of the unit. The bell cranks 22 are interconnected by linkages 25; and one of the rear bell crank arms at one side of the mixer unit base has an upward extension which carries a pivoted nut 26 having a screw threaded connection with a screw 27 which can be turned in either direction by crank arm 28.

By turning the crank arm in one direction, the unit may be elevated so that the rollers 21 support the same, thus enabling such unit to be rolled on the bed of the truck or other support surface, while by turning the arm in the opposite direction, the base of the unit is brought to rest in direct or fixed engagement with the bed of the truck so as to be fixedly supported thereon. The weight of the unit is sufficient in most cases to provide such fixed support but attaching means for safety purposes, such as chains or hold down bolts, may be provided.

As in the aforementioned patent, the described arrangement is particularly useful for a system enabling home owners or the like to obtain relatively small volumes of concrete for "do-it-yourself" jobs. For such purpose expensive and large equipment for the work is not practical because of the economic factor. With applicant's system a "do-it-yourself" individual may visit a nursery or lumber yard which usually stocks the components for a concrete mix, and obtain relatively small volumes of the mix which he can transport to the site of use by the relatively inexpensive transit mix unit that can be rented on a reasonable basis. In this connection, the concrete components are not mixed at the site where they are obtained. They are loaded dry in the mixer drum which is supplied with water beforehand or has water added thereto after the mix is introduced into the drum. The mixing of the components occurs while the mixer is in transit to the use site.

In situations where an individual may desire to use the truck for other purposes, he generally does not have a hoist to remove the mixer unit from the flat bed of the truck, and must obtain a hoist to remove it in order to render the truck useful for such other purposes. In the present invention, the mixer unit is initially positioned on the truck at the site where the equipment is mixed or rented, by means of a hoist or derrick. To enable removal of the mixer unit from the truck without the necessity of employing a hoist, and thus render it readily portable, the invention hereof provides a support for the unit against the forward end of which the truck may be backed up, and the mixer unit rolled off from the truck onto the support for storage or even for use while on the support. When it is desired to replace the mixer unit onto the bed of the truck, the support is so constructed that the unit may be readily rolled off the support onto the truck bed.

Figure 6:
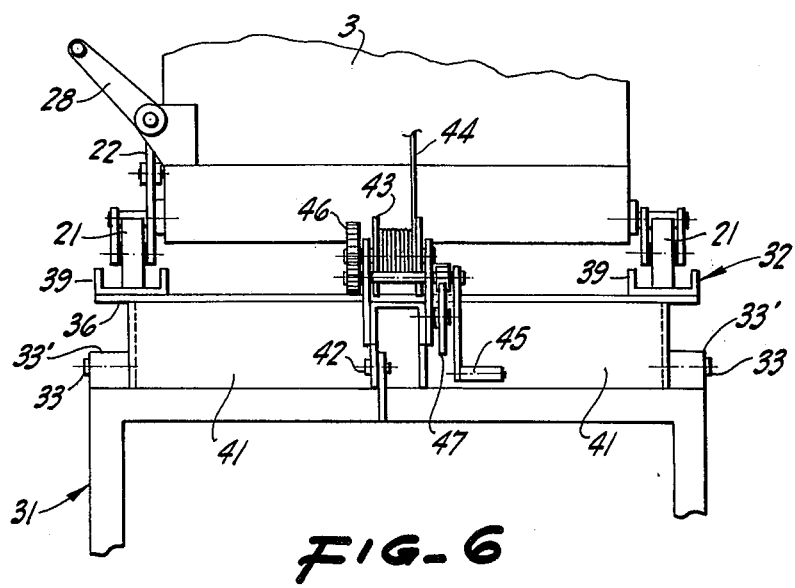
FIG. 6 is a fragmentary end elevational view looking in the direction of line 6 — 6 in FIG. 5.

Referring to FIGS. 5 through 7, the support comprises main frame stand 31 and platform 32 pivotally mounted thereon for fore and aft tilting movement on pivot shaft 33 journaled in bearing blocks 33'. Stand 31 is formed of suitable metal beams rigidly secured together, and comprises ground engaging support legs 34 which are adjustable as to length to vary the height of the entire platform or either end thereof above the ground. For this purpose, the legs are tubular and have feet 35 telescoped therein and which may be held in any desired adjusted position by suitable means, such as apertures and pins.

Platform 32 comprises a plate 36 reenforced by web 37 and cross beams 38. Spaced apart channels 39 forming U-shaped trackways are secured to platform plate 36 to receive the rollers 21 on the transit mix unit base 2. A stop 41 extends downwardly from the platform to position it substantially horizontally; and to hold it horizontally, a removable latch pin 42 is provided.

Attached to the platform of the stand is a winch 43 and a cable 44 connectable to a suitable part of the mixer unit. The winch can be turned by crank handle 45 through gearing 46. Ratchet mechanism including pivoted pawl 47 holds the unit in position when it is being pulled by the cable from the bed of the truck onto support platform 32.

Extending forwardly from the front end of the platform are bridge means 48 adapted to overlie the back of the truck bed to span the space between the platform and the truck, so that the rollers 21 may travel thereover onto the platform. Such bridge means may be channels in continuation of channels 39.

In transferring the unit from the truck bed onto the platform, the platform may be unlatched and tilted forwardly as shown in FIGS. 2 and 3, and the cable connected to the unit. Operation of the winch pulls the unit on its rollers 21 onto the platform, as shown in FIG. 4; and when fully on the platform the platform tilts rearwardly under the weight of the unit, which is held by means of the pawl and ratchet mechanism. In this connection, if adjustment of the height of the support frame is required, this may be readily done by adjusting the aforementioned feet 35.

When it is desired to re-transfer the transit mix unit onto the flat bed of the truck, the platform is tilted forwardly about pivot shaft 33', which may be readily done manually, so that it is inclined forwardly with bridge means 48 over the rear part of the truck bed; and by manually pushing the unit on its support rollers 21, it may be rolled downwardly onto the truck bed under control of the ratchet mechanism.

FIG. 8 illustrates a special truck bed construction for supporting the transit mix unit on the truck bed at a lower center of gravity, to enhance stability. The bed comprises a well 51 over longitudinal frame members 52 and having a bottom plate 53; flat side plates 54 over longitudinal side beams 56 extend from each side of the well. The transit mix support rollers 21 can ride in the well over beams 52. U-shaped channels to form spaced apart U-tracks may be provided by upstanding plates 57. Should it be desired to form a flat bed truck when the transit mix unit is not supported on the truck, the well may be covered by removably mounted cover plate 58 supported on outwardly extending flanges 59, and which is even with flat side plates 54.

I claim:

1. A transit mix system comprising a portable transit mix unit including a support base having a concrete mixer drum supported thereon, rollers carried by said base enabling the unit to be rolled on the bed of a truck, means movably connecting said rollers to said base for selectively elevating and lowering said unit out of or into engagement with said bed whereby the unit can be rolled on said bed or into engagement with said bed for fixed support thereon, a support stand including a support platform for the unit, and means carried by said stand for detachable connection to said unit to transfer the unit from the bed onto the platform when the unit is in elevated position on the rollers and the bed of the truck is adjacent the front of the platform.

2. The transit mix system of claim 1 wherein the platform is pivotally mounted between its front and rear ends for fore and aft tilting movement about a horizontal axis so that the platform can tilt from a substantially horizontal position to a forwardly inclined position.

3. The transit mix system of claim 2 wherein bridge means extends from the front of the platform to overlie the rear of the truck bed when transfer of the mixer unit is effected from the truck bed onto the platform and vice versa.

4. The transit mix system of claim 3 wherein said platform comprises spaced apart trackways to receive said rollers.

5. The transit mix system of claim 2 wherein means is provided to latch the platform in said horizontal position.

6. The method of rendering a truck useful for other loads in a transit mix system wherein a portable transit mix unit is mounted on the bed of a truck, which comprises providing support rollers on the unit enabling it to be moved readily, movably connecting said rollers to said unit for selectively elevating and lowering said unit out of or into fixed engagement with said truck bed, providing a support having a support platform for said unit, backing the truck adjacent the front of the platform, with the unit elevated relative to said bed, rolling the unit from the truck bed onto the platform, and when such unit is to be used again on the truck rolling it from the platform onto the truck bed, and subsequently lowering said unit into fixed engagement with said truck bed.

7. The method of rendering a truck useful for other loads in a transit mix system wherein a portable transit mix unit is mounted on the bed of a truck, which comprises providing support rollers on the unit enabling it to be moved readily, providing a support having a support platform for said unit, backing the truck adjacent the front of the platform, rolling the unit from the truck bed into the platform, and when such unit is to be used again on the truck rolling it from the platform onto the truck bed; said method further comprising providing a winch and a cable which is carried by the support to roll the unit from the truck bed, and the unit is rolled under gravity from the platform by providing a tiltable mount for the platform, allowing the platform to tilt forwardly under the weight of the unit, and controlling the rolling under gravity by the winch.

8. The method of claim 7 including the step of bridging space between the platform and the truck bed.

9. In a transit mix system, a truck for transporting a portable unit having a base and a concrete mixer drum mounted thereon, said truck having a bed comprising spaced apart flat horizontally extending side plates positioned at substantially the same level and a well therebetween to receive the unit for lowering the center of gravity when the unit is supported on the truck, and a cover plate for removable mounting over said well substantially even with said side plates to provide a flat truck bed when desired which extends substantially full width of the truck.

10. The system of claim 9 wherein the well bottom is provided with spaced apart U-shaped trackways for receiving rollers on the base of the mixer unit.

* * * * *